United States Patent
Vanstone et al.

(10) Patent No.: US 8,634,562 B2
(45) Date of Patent: *Jan. 21, 2014

(54) SECURE INTERFACE FOR VERSATILE KEY DERIVATION FUNCTION SUPPORT

(75) Inventors: Scott A. Vanstone, Campbellville (CA); Robert P. Gallant, Corner Brook (CA); Daniel R. L. Brown, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,451

(22) Filed: Sep. 14, 2012

(65) Prior Publication Data

US 2013/0246805 A1      Sep. 19, 2013

Related U.S. Application Data

(63) Continuation of application No. 11/272,151, filed on Nov. 14, 2005, now Pat. No. 8,335,317.

(60) Provisional application No. 60/626,921, filed on Nov. 12, 2004.

(30) Foreign Application Priority Data

Nov. 11, 2004   (WO) .................. PCT/IB2004/03705

(51) Int. Cl.
   *G06F 21/00*   (2013.01)

(52) U.S. Cl.
   USPC ............................................ 380/282; 380/44

(58) Field of Classification Search
   None
   See application file for complete search history.

(56) References Cited

U.S. PATENT DOCUMENTS 5,046,094 A    9/1991  Kawamura et al.
5,369,708 A    11/1994 Kawamura et al.
(Continued)

FOREIGN PATENT DOCUMENTS

JP    03-72737    3/1991
JP    06-19393    1/1994
(Continued)

OTHER PUBLICATIONS

Certicom Research: "Standards for Efficient Cryptography, SEC 1: Elliptic Curve Cryptography", Internet Citation, Sep. 20, 2000, XP003011889, Retrieved by EPO Jan. 1, 2001 from http://secg.org/download/aid-385/sec1_final.pdf.

(Continued)

*Primary Examiner* — Philip Chea
*Assistant Examiner* — Carlton Johnson
(74) *Attorney, Agent, or Firm* — Etienne de Villiers; Dimock Stratton LLP

(57) ABSTRACT

Improper re-use of a static Diffie-Hellman (DH) private key may leak information about the key. The leakage is prevented by a key derivation function (KDF), but standards do not agree on key derivation functions. The module for performing a DH private key operation must somehow support multiple different KDF standards. The present invention provides an intermediate approach that neither attempts to implement all possible KDF operations, nor provide unprotected access to the raw DH private key operation. Instead, the module performs parts of the KDF operation, as indicated by the application using the module. This saves the module from implementing the entire KDF for each KDF needed. Instead, the module implements only re-usable parts that are common to most KDFs. Furthermore, when new KDFs are required, the module may be able to support them if they built on the parts that the module has implemented.

15 Claims, 4 Drawing Sheets

(56) References Cited

U.S. PATENT DOCUMENTS

| | | | |
|---|---|---|---|
| 5,937,066 | A | 8/1999 | Gennaro et al. |
| 6,304,658 | B1 | 10/2001 | Kocher |
| 6,862,696 | B1 | 3/2005 | Voas et al. |
| 7,382,882 | B1 | 6/2008 | Immonen |
| 2002/0073319 | A1 | 6/2002 | Manabe |
| 2005/0120213 | A1 | 6/2005 | Winget et al. |

FOREIGN PATENT DOCUMENTS

| | | |
|---|---|---|
| WO | WO99/43120 | 8/1999 |
| WO | WO03/065169 | 8/2003 |
| WO | WO00/02358 | 1/2008 |

OTHER PUBLICATIONS

Dierks T and Allen C:"The TLS Protocol Version 1.0", RFC2246, Jan. 1, 1999, XP008129358.

"Java Card (TM) 2.1.1 Application Programming Interface", May 18, 2000, XP 55003024, Retrieved by EPO Jul. 19, 2011.

Krawczyk, H: "Signma: The Sign-and-Mac Approach to Authenticated Diffie-Hellman and its Use in the IKE Protocols", Advances in Cryptology—Crypto 2003. 23rd Annual international Cryptology Conference, Santa Barbara, CA Aug. 17-21, 2003, pp. 400-425.

Freier A et al., "The SSL Protocol Version 3.0" Internet Draft, Nov. 19, 1996, pp. 36-37.

EESR from EP05801173, dated Aug. 12, 2010.

US 8,634,562 B2

SECURE INTERFACE FOR VERSATILE KEY DERIVATION FUNCTION SUPPORT

This application claims priority from PCT Application No. PCT/IB2004/003705 filed Nov. 11, 2004 and U.S. Provisional Patent Application No. 60/626,921 filed Nov. 12, 2004.

FIELD OF INVENTION

The invention relates generally to the field of cryptography. In particular, the invention relates to providing versatile key derivation function support.

BACKGROUND OF INVENTION

Diffie-Hellman (DH) key agreement is a fundamental development in cryptography. It is the first workable method of public-key cryptography, that made key distribution feasible without setting up pre-arranged secrets.

In the simplest form of the DH key agreement, each party has a respective private key x, y from which a public key $\alpha^x$, $\alpha^y$ respectively, can be derived. By exchanging public keys, each party can compute a shared secret key $\alpha^{xy}$ by combining the private and public keys. The function used to derive a public key from a private key is a one way function that makes computation of the public key relatively simple but renders it infeasible to extract the private key from the public key. Such a function is based on the difficulty of factoring large numbers which are the product of two large primes or the discrete log problem over finite fields.

Diffie-Hellman (DH) key agreement is in wide use today. The IPSec protocol uses DH key agreement, and IPSec is used in most Virtual Private Networks (VPNs) that most corporations use for allowing employees to connect remotely to the corporate network, as well as for connecting separate offices over the open Internet.

Diffie-Hellman key agreement is also a NIST recommended option in the Transport Layer Security (TLS) protocol. The TLS protocol is the successor to the SSL protocol. These protocols are used widely today for securing sensitive web traffic, such as online banking.

Static DH key agreement is a variant of DH key agreement in which one of the private keys is static, which means that it is a long term key to be used multiple times.

Because of the sensitivity of the private key, particularly where it is used multiple times, it is usually located in a private key module, which is an implementation that includes the private key operation. Generally, such modules include measures to prevent extraction of the private key, and to a much more limited extent, abuse of the private key operation. For example, these modules can be implemented in specialized hardware that does not admit the loading of malicious software such as viruses, worms and Trojan horses. Generally, such anti-tampering measures are expensive to implement. Therefore, to reduce costs, modules are generally designed with a minimum functionality. That way, the least amount of functionality needs anti-tampering protection.

By way of a simple example, a module may be a smart card. The smart card is owned by a user. Suppose that the user wishes to make a secure connection to a destination, such as a home computer from some remote computer. The user enters the smart card into a smart card reader attached to the remote computer. Then a connection is made to the home computer. The home computer authenticates the user by sending a challenge. The remote computer forwards the challenge to the smart card. The smart card signs the challenge, which is then forwarded back to the home computer. The home computer verifies the challenge and then provides the necessary access to the user via the remote computer. This allows the user to move around to different remote computers. The remote computers, however, should not be able to extract the user's private key from the smart card. That is, they should only be able to connect to the home computer while the user leaves the smart card in the reader. (For this to be achieved, a more sophisticated method than simple challenge and response is needed. Instead, the smart card may need to perform regular authentication of traffic or even encryption and decryption of all of the traffic.)

To enhance security further, a key derivation function (KDF), which is a one-way function applied to the raw DH shared secret, is often specified. Some standards specify that a KDF is to be used with DH key agreement. Different standards recommend different KDFs, however. For example, ANSI specifies several different KDFs, as does IEEE, as do SSL and TLS, and different yet again is IPSec.

The following provides a simplified description of the details behind two standardized key derivation functions. These are the ANSI X9.63 key derivation and the TLS key derivation functions.

The ANSI X9.63 key derivation is computed as follows. The input has three components. The first input component is Z, which is a secret value shared between the private key module and the destination, for example, the home computer in the simple example above. This shared secret value Z is not to be revealed to any gateway, such as the remote computer in the example above. The second input component is an integer key datalen, which is the length in octets of the keying data to be generated. The optional third input component is an octet string SharedInfo, which consists of some data shared by the entities who share the shared secret value Z. Furthermore, SharedInfo can also optionally be given an encoding of the Abstract Syntax Notation One (ASN.1), which includes 5 fields: an algorithm identifier, optional identifiers for each of the two entities, optional public shared information and optional private shared information. Evaluation of the KDF on this input then proceeds as follows.

The first steps of the ANSI X9.63 key derivation function are certain consistency checks made on the lengths of the inputs and the desired output length keydatalen. Then a 4-octet integer counter j is initialised with value 1. A series of hash values Kj are computed as follows: Kj=SHA-1(Z||j||[SharedInfo]), where || indicates concatenation and [ ] indicates that the bracketed input is optional. The number t of these outputs depends on keydatalen. The hash values are concatenated to form a octet string K'=K1||K2|| . . . ||Kt. The octet string is truncated to a shorted octet string K by taking the leftmost keydatalen octets. The output of the ANSI X9.63 KDF is K.

In the TLS standard, key derivation functions are called pseudorandom functions (PRF). The construction of the TLS PRF is quite different from the ANSI X9.63 KDF, and is given as follows. The construction makes use of an auxiliary construction HMAC, which is described first.

The HMAC construction can be built on any hash function. When the HMAC construction is used with a hash function; such as MD5 and SHA-1, then the resulting function is labelled HMAC-Hash, where Hash is the name of the hash function. The TLS PRF uses HMAC-SHA-1 and HMAC-MD5. The generic form of HMAC, namely HMAC-Hash, operates as follows.

The inputs to HMAC are a secret key K and a message M. The output is a tag T. The HMAC tag is computed as T=Hash((C+K)||Hash((D+K)||M)) where || indicates concatenation, + indicates the well-known bit-wise exclusive-or (XOR) operation, and C and D are constant bit strings as determined by the HMAC algorithm. More precisely, the key K is padded with zero bits until its length matches that of C and D, except if K is longer than C and D, in which case, K is replaced with the hash of the key. This is written as:

$$T = \text{HMAC-Hash}(K, M).$$

The function HMAC-Hash is used in another auxiliary hash-generic construction in TLS PRF, called P_Hash. The construction for P_Hash is as follows:

$$P\_\text{Hash}(Z, \text{seed}) = \text{HMAC-Hash}(Z, A(1) \| \text{seed}) \| \text{HMAC-Hash}(Z, A(2) \| \text{seed}) \| \text{HMAC-Hash}(Z, A(3) \| \text{seed}) \| \ldots$$

where $\|$ indicates concatentation and $A(\ )$ is defined as follows:

$$A(0) = \text{seed}; \; A(j) = \text{HMAC\_Hash}(Z, A(j-1)).$$

P_Hash can be iterated as many times as necessary to produce the necessary amount of data As with the ANSI X9.63, the truncation of the final (rightmost) bytes is used when the resulting concatenation of HMAC tags is longer than the amount of data needed.

The TLS PRF is defined as follows:

$$\text{PRF}(Z, \text{label}, \text{seed}) = P\_\text{MD5}(S1, \text{label} \| \text{seed}) + P\_\text{SHA-1}(S2, \text{label} \| \text{seed})$$

where, as usual, + indicates exclusive-or and $\|$ indicates concatenation. The values S1 and S2 are obtained by partitioning the octet string secret Z into two halves, the left half being S1 and right half S2, with the left half being large secret has an odd number of octets.

Because the MD5 outputs as specified by the algorithm are 16 octets while the SHA-1 outputs are 20 octets, the function P_MD5 will generally use more iterations than P_SHA-1.

The TLS PRF is used extensively in the TLS protocol. For example, it is used to derive a master secret from a pre-master secret, and it is also used to derive an encryption key from the master key, and so on.

The disharmony between standards on KDF creates a large incentive to module implementers either to support DH key agreement without the KDF, or to support just a limited number of KDFs.

The standard Public Key Cryptography Standard (PKCS) #11: Cryptographic Token Interface (cryptoki) addresses an interface for tokens such as smart cards, which are a class of private key modules. In this standard, a few KDFs are supported, but the interface provided are generally not KDF-flexible. The standard FIPS 140-2 also specifies requirement for private key modules. It explicitly requires that the cryptographic values such as raw DH shared secret values do not depart the security boundary of the private key module, but it does not provide a precise mechanism for key derivation.

The inventors have discovered that improper re-use of a static DH private key can ultimately result in recovery of the private key by an adversary. More precisely, when a shared secret established via static DH key agreement is used without application of a key derivation function (KDF), an adversary can launch an attack where multiple different shared keys are established and used, thereby recovering the static DH private key.

The inventors' recent discovery means that the option of implementing DH without KDF can be a security risk. Supporting a reduced number of KDF's may be too limiting: for example, it may require hardware upgrade just to use a new application standard.

As standards do not agree on key derivation functions, the module for performing a DH private key operation must somehow support multiple different KDF standards. One approach is for the module to implement all the KDF algorithms, which can be expensive because the module must support multiple different KDFs and limiting because the module cannot support new KDFs when these arise. The opposite approach is for the module to provide unprotected access to the raw DH private key operation, and let the application using the module apply the KDF. However, this renders the private key vulnerable to the recently discovered attacks.

It is an object of the present invention to obviate or mitigate the above disadvantages.

SUMMARY OF INVENTION

In general terms, the present invention permits the module to perform parts of the KDF algorithms, as indicated by the application using the module. This saves the module from implementing the entire KDF for each KDF needed. Instead, only re-usable parts are implemented that are common to most KDFs. Furthermore, when new KDFs are required, the module may be able to support them if they are built on the KDF parts that the module has implemented.

In this manner, raw access to the static DH private key operation is not permitted on the module, because this generally tends to be too much of a security risk. Instead, the module provides an interface flexible enough to support all existing KDFs of interest as well as all foreseeable KDFs. This is done by implementing the common parts of the existing and foreseeable KDFs on a secure private key module, Most KDFs today are built on hash functions. Conveniently, most private key modules need to implement at least a hash function. This is also important for anti-tampering considerations because a hash function is crucial to the security of many algorithms, such as digital signatures.

As an alternate to this, the module can also simply provide access to the compression function of SHA-1. The application can use this compression function to compute SHA-1 just by adding some necessary padding and doing some appropriate chaining. This further simplifies the implementation module and also makes it more flexible. For example, some additional flexibility is that certain ANSI deterministic random number generators use the SHA-1 compression function instead of the whole of the function SHA-1. More generally, random number generation, like key derivation, generally involves a combination of hash function evaluations upon a mixture of secret and non-secret inputs. Therefore the present invention is not just limited to supporting multiple KDFs, it can also support multiple deterministic random number generators.

For even greater flexibility, the module could support more atomic operations, such as some of the sub-operations of the SHA-1 compression function. However, it does not seem likely that these sub-operations will be re-used for some purpose other than the SHA-1 compression function. Also, these individual sub-operations do not provide the full security of SHA-1, and may therefore expose secrets on the module to the application, which is to be avoided. An exception to this principle, however, are the two pairs of new hash functions: the pair SHA-384 and SHA-512, and the pair SHA-224 and SHA-256. Each of these pairs has much in common and could essentially be implemented with a single common function. The application would process the inputs and outputs only to the common function to obtain the desired hash function.

In the case of the TLS key derivation, known as pseudo-random function (PRF) in TLS terminology, two hash functions are used. One is SHA-1 and the other is MD5. To apply the PRF-TLS to a secret Z, the secret is split into two halves, S1 and S2. Then a PRF based on MD5 is applied to S1 and a function based on SHA1 is applied to S2. To save the module from implementing both MD5 and SHA1, which is potentially costly, the module could instead provide a mechanism to reveal S1 to the application and keep S2 within the module. The module could perform the SHA1 calculation on S2 and the application could perform the MD5 calculation on S1.

Although it is not anticipated that any other KDF than the one in TLS will divide up secrets in such a manner, it tends to be difficult to predict which way standards will go. Therefore it may be useful for a module to support a generic method of dividing up a secret. The interface for the module therefore includes a mechanism whereby the application can request that part of a secret is made public. The module is implemented in a way such that enough of the secret remains secret, and that the application cannot make multiple request for different parts of the secret.

Because new standards keep arising, and because standards keep re-designing KDFs and random number generators, a flexible and secure interface to a hardware module provides considerable value for extending the usability of the module. Otherwise the module risks becoming obsolete too quickly.

In one aspect, a method of computing a cryptographic function involving a shared secret is provided, the shared secret being accessible to a first module. The method comprises the steps of performing on the first module, at least one operation of the cryptographic function utilizing the shared secret; and providing a result of the at least one operation to an application running on a second module to complete computation of the cryptographic function.

In another aspect, a cryptographic apparatus is provided comprising a first module having a shared secret and a processor to perform at least one cryptographic operation using the shared secret and produce a result therefrom; a second module running an application to compute a cryptographic function; and a data connection between the first and second modules to transfer the result from the first module to the second module to enable the second module to complete computation of the cryptographic function using the result.

BRIEF DESCRIPTION OF DRAWINGS

An embodiment of the invention will now be described by way of example only with reference to the accompanying drawings, in which.

DETAILED DESCRIPTION OF EMBODIMENTS

Figure 1:
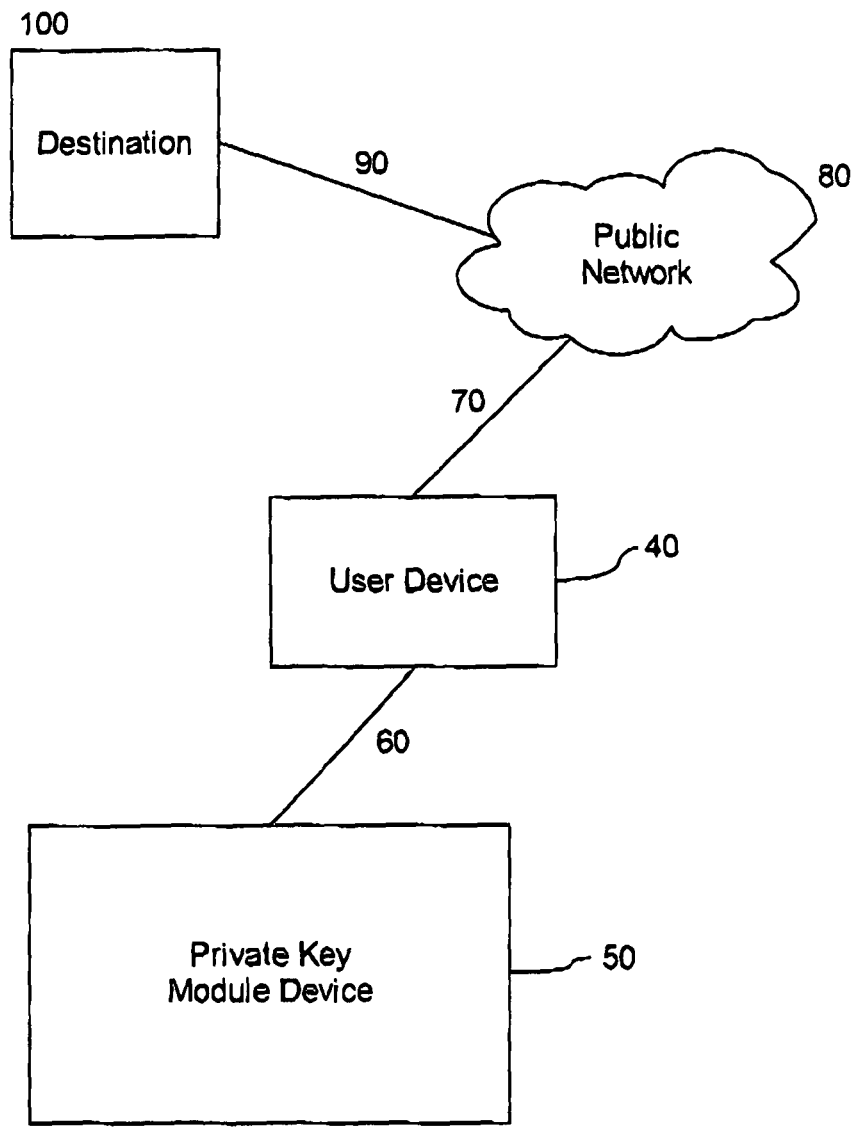
FIG. 1 is a block diagram showing a connection between a user device and a destination secured with a private key module.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Referring to FIG. 1, there is shown a connection between a user device 40 and a destination 100 secured with a private key module device 50. The connection between user device 40 and destination 100 is generally not secure and is open. For example, the connection may consist of a link 70 to a public network 80, such as Internet, and a link 90 from the public network to destination 100. Either link may be a wired link, wireless link or a combination of both. In general, private key module device 50 is a self-contained device, such as a smart card or token, which may be inserted into some local device, or user device 40, on which the application runs. The module device 50 cooperates with the user device 40 when invoked by an application to secure a communication over the link 70.

In this mode of operation, the private key module device 50 provides a private key functionality to secure the connection between user device 40 and the destination device 100. However, since private key module device 50 is a custom private key module, it would need some additional protection beyond that of a typical user computer like user device 40, such as anti-tampering protection. Implementing a key derivation function (KDF) partly in an application running on user device 40 and partly in a module executing on private key module device 50 enhances the security. It will be appreciated that although user device 40 and private key module device 50 are described as distinct devices here, they may be integrated into a single physical device. For example, private key module device 50 may reside on user device 40 as a special embedded chipset.

The user device 40 typically will run multiple applications and perform different functions utilizing a CPU 42 and memory device 44. The user device 40 includes a communication module 45 to manage the link 70 under direction of a communication application running on the CPU 42. To establish a secure communication, the communication application implements an established secure protocol, such as one of those discussed above, that requires a private key functionality, such as a KDF. To facilitate computation of a selected KDF, whilst maintaining flexibility, the KDF derivation is separated into discreet subroutines and those that require operation on a private key are performed by the private key module 50. The balance are performed by the user device 40 so that the raw private key data is not accessible through the user device 40.

Figure 2:
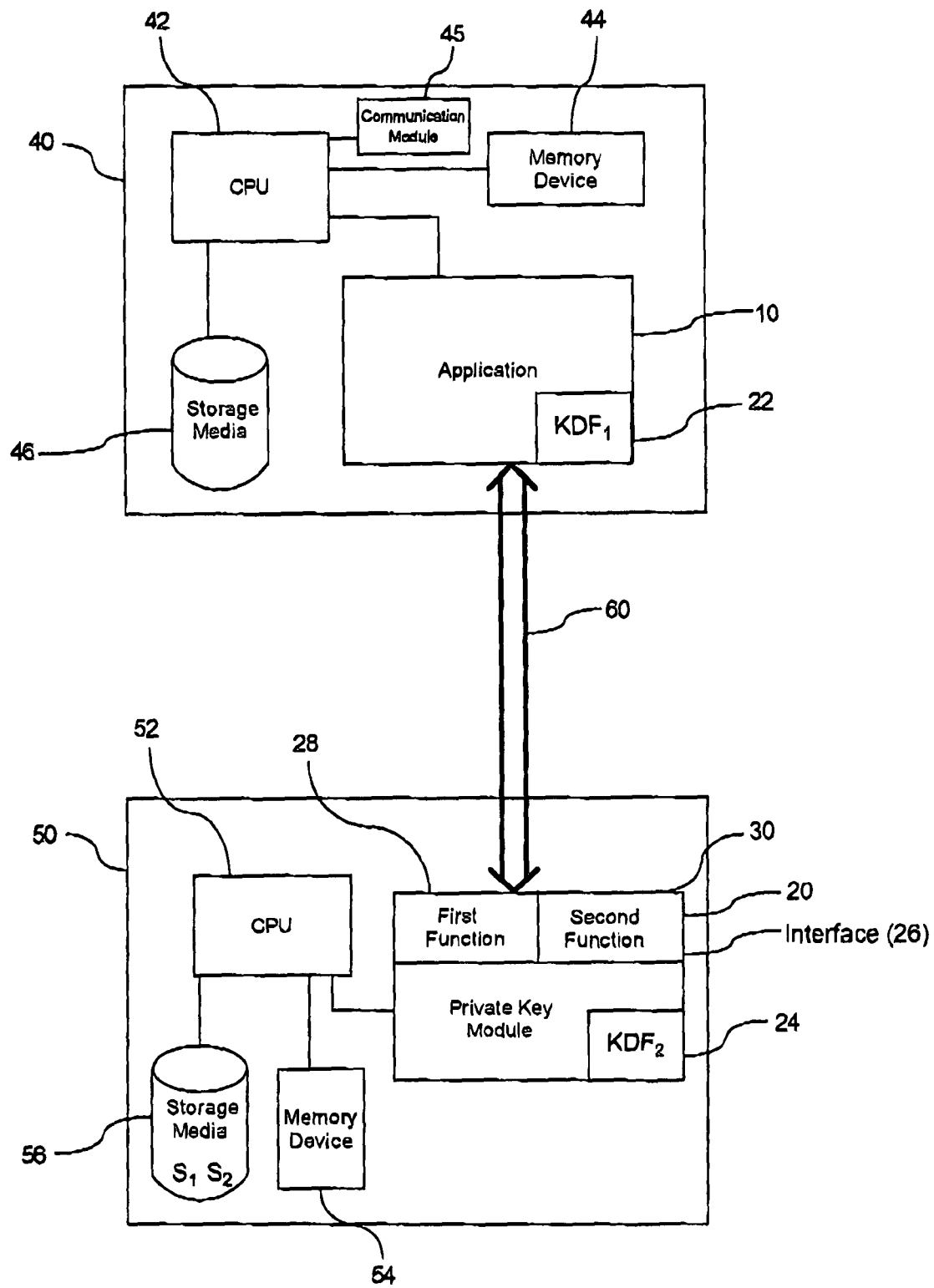
FIG. 2 is a schematic diagram illustrating implementation of a key derivation function in the user device and the private key module shown in FIG. 1.

Referring to FIG. 2, there is shown an exemplary implementation of a security system that has a key derivation function (KDF) implemented partly in an application 10 running on the user device 40 and partly in an application 20 running on a private key module 50. The KDF is divided into two parts. Private key module 50 generates components 24 of the KDF and application 10 uses those components to compute the balance 22 of the KDF. Private key module 20 has a module interface 26 for exchanging data and communicating with application 10. Module interface 26 further has two interface functions, a first interface function 28 and a second interface function 30.

Advantageously, some secret value, such as a Diffie-Hellman shared secret value Z, are determined in private key module 20. The length of Z is made known to application 10, but the value of Z is not. Application 10 has a handle whereby it can reference the secret Z and thus ask private key module 20 to derive values from Z.

The first interface function 28 has input consisting of an integer and the handle of secret Z. This integer defines the number of octets of Z that shall be revealed to application 10. This is the S1 value in the TLS PRF. When executing this function, private key module 20 can enforce a minimum number of octets of the secret to be retained as S2, so that application 10 does not learn the entire secret. The minimum number is chosen to be appropriate for the intended security level of the application. It may be 10 octets for a security level of 80 bits. Once first interface function 28 is called, the secret may be permanently truncated to S2, and private key module 20 will not allow further truncation of S2. A handle or pointer for referencing S2 is provided to application 10. Preferably, the handle or pointer referencing Z may be re-used as Z is not used in further computation. Henceforth, private key module 20 sets the secret Z=S2 after first interface function 28 is called. Optionally private key module 20 can create a new handle that points to just S2 and output this new handle to application 10, enabling application 10 to refer to S2 later on. The value S1 is always part of the output of first interface function 28, so that application 10, i.e., first part 22 of the KDF contained in application 10, can perform any calculations it needs to on S1, such as the MD5 calculations used in the TLS PRF.

The second interface function 30 has input consisting of two values X and Y and the handle of the secret Z. The first value is an octet string of length identical to the secret Z. The output of second interface function 30 is:

$$\text{SHA-1}(X+Z\|Y).$$

Second interface function 30 is the fundamental cryptographic operation from which both the ANSI X9.63 KDF and the TLS PRF can be built. From the output S1 of first interface function 28 and the output of second interface function 30, namely, the hash value of SHA-1, application 10 can complete the KDF computation and derive a key.

User device 40 generally has a CPU 42, memory device 44 accessible to CPU 42 storage media 46, also accessible to CPU 20, and some input and output devices (not shown). As will be appreciated, user device 40 may also be some other programmable computation device. Application 10 executes on CPU 42. Application 10 may be stored on storage media 46, which may be permanently installed in user device 40, removable from user device 40 or remotely accessible to user device 40. Application 10 may also be directly loaded to CPU 42. Output of the KDF is required for securing the connection from user device 40 to destination 100.

Private key module device 50 generally has a CPU or a microprocessor 52, memory device 54 accessible to CPU 52 and storage media 56, also accessible to CPU 52. Private key module 20 executes on CPU 52. Private key module 50 may be stored on storage media 56 or directly loaded to memory device 52. Private key module 50 may store the secret private key in its memory device 54 or its storage media 56. As will be appreciated, private key module 50 may also have input means, such as a keyboard where private key module device 50 is a smart card with keyboard, for users to enter a secret private key.

While the distinction is made here that there are memory device 54 which tends to be used for storing more volatile data and storage media 56 which tends to be used to store more persistent data, private key module device 50 may have only a single data storage device for storing both volatile and persistent data. Similarly, user device 40 may have only a single data storage device for storing both volatile and persistent data.

Data link 60 provides a communication channel between application 10 and private key module 50 when needed. Data link 60 may be wired, or wireless. It may be a direct connection between user device 40 and private key module device 50. The data link 60 may be permanent, or more preferably, a connection that is established on demand. In general, data link 60 is not an open link but instead is a protected link.

As noted above, private key module 20 does not implement an entire KDF. Components 24 of the KDF generated in private key module 50 implements only those re-usable portions and only the part that performs the cryptographic operations that are fundamental to security. This promotes flexibility without compromising security. When implementing a DH protocol, for example, raw access to the static DH private key operation is not permitted on the module. Instead, the module provides an interface flexible enough to support all existing KDFs of interest as well as all foreseeable KDFs. One way to do this most efficiently is to implement the common parts of the existing and foreseeable KDFs. Most KDFs today are built on hash functions, although it is also foreseeable that some in the future will be built from block ciphers. Most private key modules ought to support at least a hash function, because a hash function is crucial to the security of many algorithms, such as digital signatures. Fortunately, fewer hash functions are standardized than KDFs. For example, the hash function SHA-1 can be re-used to support several different KDFs, such as the distinct ANSI, IPSec and TLS key derivation functions. The TLS key derivation also uses another hash function, MD5, but this can be handled outside of the module 50, as explained further below.

Figure 3:
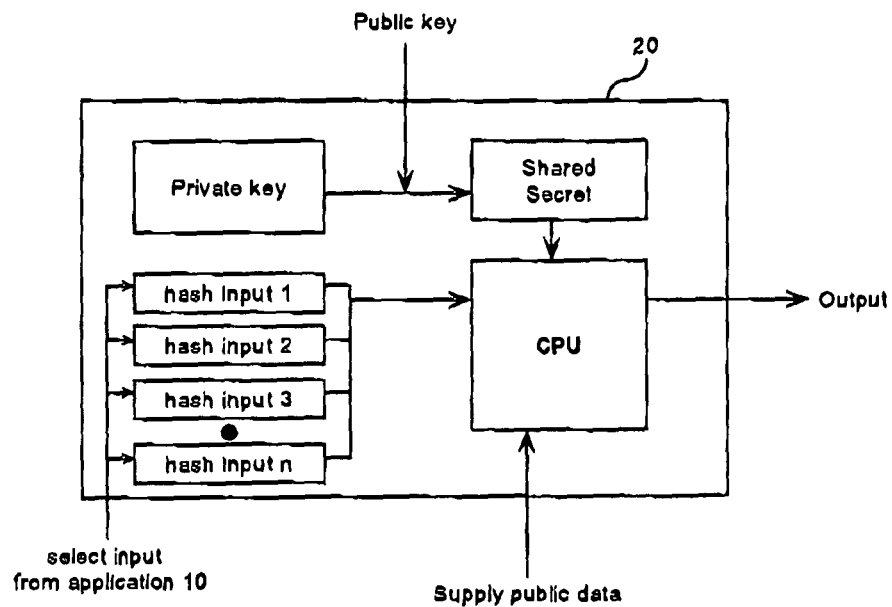
FIG. 3 is a schematic diagram illustrating a private key module device.

Referring to FIG. 3, for KDFs that are generated using SHA-1 operations, the application 10 instructs the private key module 50 what input to supply as the input to the hash function. Some of the input is a secret and unknown to the application. To specify this, the application 10 refers to such secret input via a handle or pointer 57. Public input may be provided directly by the application 10. Formatting of the input, which is custom to each KDF, is specified by generic formatting interface provided by the module. The hash outputs that private key module 50 provides to the application 10, may be re-used by the application 10 as further inputs to more hash function calls. This is because many KDFs are based on a chaining mechanism where the output of one hash call is fed into the input of another hash call.

The operation in support of the ANSI X9.63 KDF and TLS PRF, ANSI X9.63 KDF derives a key from a shared secret value by computing a series of hash values computed from hash function SHA-1 based on the shared secret value and then truncating an octet string formed from the concatenation of the hash values, while TLS PRF has a much more complicated construction, involving the computation of both hash function MD5 and hash function SHA-1.

A goal of the module interface 26 is to not implement the hash function MD5. Only the hash function SHA-1 is implemented on private key module 20, namely on the second part 24 of the KDF. The application 10 using private key module 20 is therefore responsible for implementing MD5 in its first part 22 of the KDF. From a security perspective, this may not present a significant drawback. This is because the MD5 hash function is not universally considered to provide adequate security, whereas the SHA-1 hash function tends to be universally accepted to provide adequate security for the purposes of key derivation, for all but the highest security levels (these higher levels require the use of SHA-256 or another successor to SHA-1).

Figure 4:
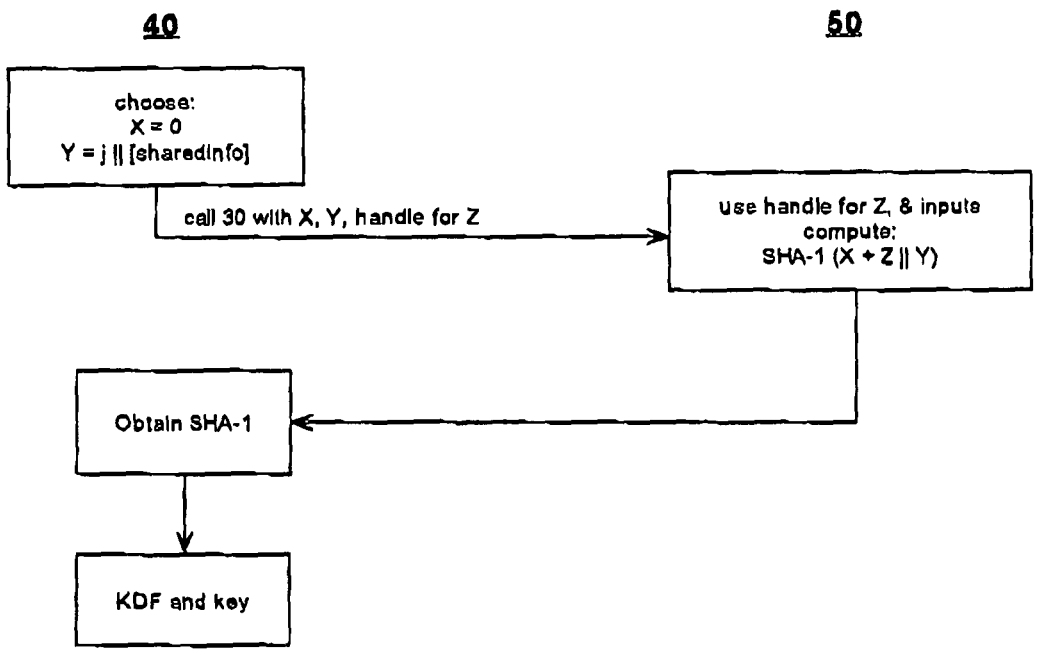
FIG. 4 is a flow chart illustrating one example of a key derivation function.

The operation in support of ANSI X9.63 KDF is generally shown in FIG. 4. In such operation, application 10 chooses X=0 and Y=j||[SharedInfo], where j is the 4-octet counter that the application maintains. Application 10 may then call function 30 with X, Y and the handle for Z. The application 20 of the private key module 50 may then use the values for X and Y and the handle for Z supplied by application 10 to compute the SHA-1 according to the expression described above and shown in FIG. 4. The application 10 may then obtain the computed SHA-1 value and use this for building the ANSI X9.63 KDF and deriving a key.

Figure 5:
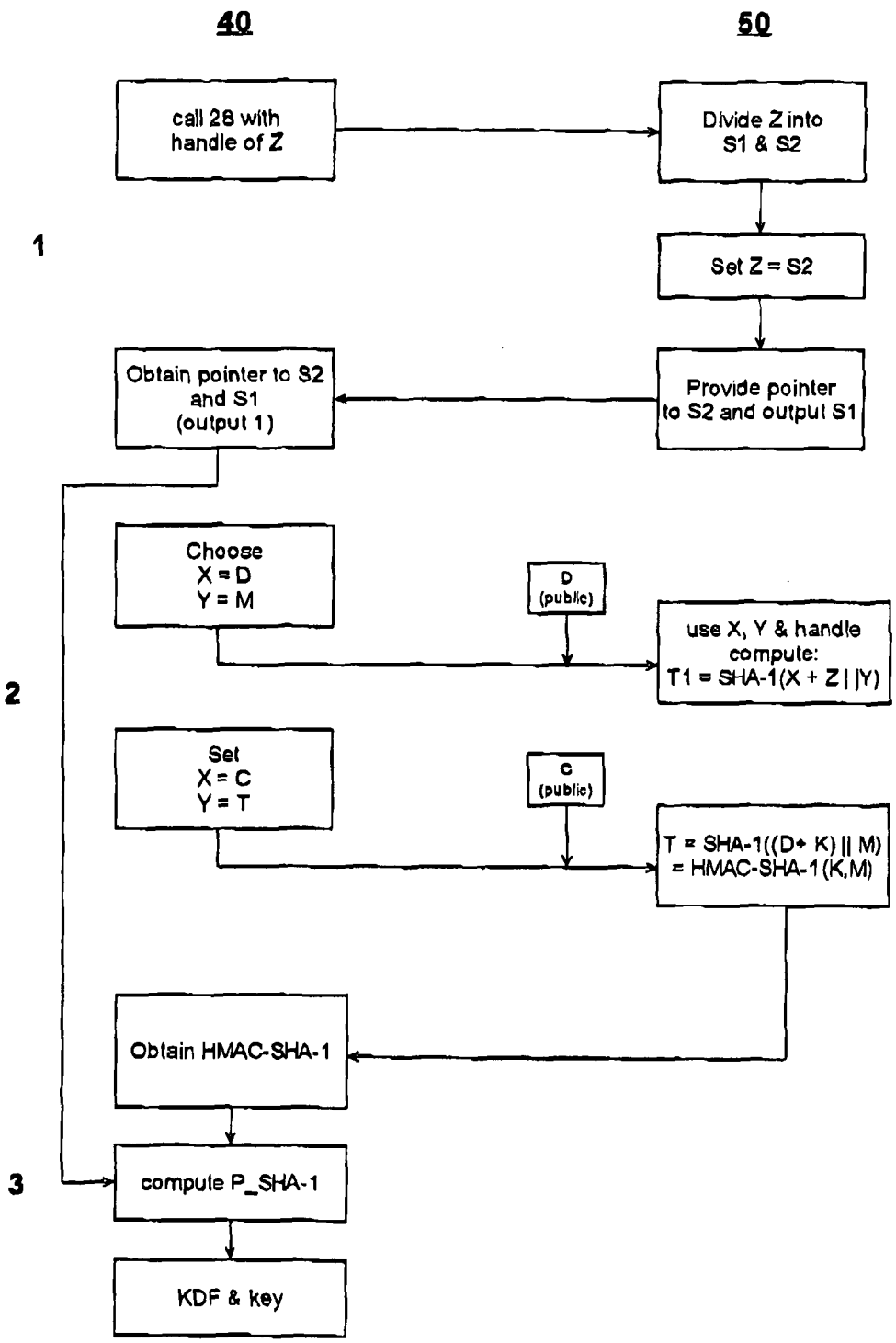
FIG. 5 is a flow chart illustrating another example of a key derivation function.

The operation of applications 10 and 20 in support of the TLS PRF is shown in FIG. 5. The application 10 calls the first interface function 28 in order to divide the shared secret Z into two halves S1 and S2 (part 1 of FIG. 5) and described above regarding function 28. The application 10 then calls the second interface function 30 to compute a hash value based on S2 (part 2 of FIG. 5), and then uses the construction above to compute P_SHA-1 from the outputs of the first and second interface functions 28, 30 (part 3 of FIG. 5). Parts 2 and 3 are explained below.

To build the function HMAC-SHA-1 used in part 2 of the TLS-PRF operation shown in FIG. 5, application 10 first calls second interface function 30 with X=D and Y=M and the handle for key K, which gives T1=SHA-1 ((D+K)∥M). (The value of D is a publicly known constant, so is available to application 10.) Then application 10 sets X=C and Y=T with the same handle for K, to get T=SHA-1 ((C+K)∥T1)=HMAC-SHA(K, M). (The value of C is public like D.)

If the key K needs to be padded with zero bits, then application 10 will account for this by prepending the second input Y with the necessary zero bits as XORed with the appropriate octets of the constant C and D. If the key K is long enough to require compression first, then application 10 can do this by setting X=0 and Y=0, to get the hashed key. In this case, application 10 may be optionally able to perform the rest of the computation on its own, because it has all the information necessary, or it may be use yet a third interface feature to designate the above hash output as another secret with a new handle.

To build the function P_SHA-1 in part 3 of the operation supporting TLS-PRF shown in FIG. 3, the application 10 now uses S1 provided as an output in part 1 and the construction above for computing HMAC-SHA-1, where the secret key is confined to private key module 20. This involves computing A(0), A(1), A(2), using iterated applications of HMAC_SHA-1 which are then used in turn to form the output of P_SHA-1 by further application of HMAC_SHA-1.

The output P_SHA-1 may then be used to build the KDF and derive a key.

The example above assumes that the keys derived in private key module 20 are delivered as output to application 10. An alternative to this is the keys derived remain within private key module 20, and the outputs are just handles or pointers to the said keys. An advantage of this is that all keys can be retained on private key module 20, which gives the module holder greater assurance that application cannot abuse even the derived session keys, let alone the long-term private keys.

In an alternative embodiment, private key module 20 has an even greater degree of flexibility. Private key module 20 supports some simple execution language, such as javascript or java, which enables a vast generality of operations to be performed on the card. In other words, application 10 supplies a program to private key module 20, which private key module 20 then executes. The program, while in the module, can access secrets freely. For security, private key module 20 ensures all outputs from the module go though approved secure algorithms, such as a hash algorithm like SHA-1 or as part of symmetric encryption operation like ABS. This prevents most abuses that a malicious program could attempt.

To further enhance security, private key module 20 may require that the program be digitally signed by a signer whose public verification key has already been securely loaded onto private key module 20. This is one way to authenticate the program loaded into private key module 20. Program authentication ensures that the program is not a malicious executable with the objective of compromising the module's secrets.

With program authentication it is not as necessary to restrict the module output to certain hashes or other algorithms, because program itself is trustworthy enough to perform any algorithm.

The advantages of this alternative embodiment over the first embodiment are that it offers greater flexibility, such as allowing a variety of hashes, both existing and new, to be executed on the module. The disadvantage is that the module needs to support a general execution language, and possibly a portion of a public key infrastructure.

It will be appreciated that although the above examples are provided in the context of key derivation functions, the principles outlined herein are applicable to other cryptographic functions such as random number generators.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

The invention claimed is:

1. A method of computing a cryptographic operation on a computing device, the method comprising:
   i) an application executing on the computing device requesting a private key module of the computing device to divide a secret value into a first part and a second part;
   ii) the module dividing the secret value into a first part and a second part, and returning one of the first half and the second half and a pointer to a key K comprising the other of the first half and the second half to the application;
   iii) the application providing a public constant D, a message M and the pointer to the key K as input values to the module, and requesting the module to compute a cryptographic hash function using the input values;
   iv) the module computing the cryptographic hash function using the input values, and returning a hash value T1 to the application;
   v) the application providing a public constant C, the hash value T1 and the pointer to the key K as second input values to the module, and requesting the module to perform the cryptographic hash function using the second input values;
   vi) the module computing the cryptographic hash function using the second input values and returning hash function output to the application; and,
   vii) the application computing an iterative cryptographic function using the one of the first half and the second half and the hash function output to produce a result.

2. The method according to claim 1, further comprising: after the application computing an iterative cryptographic function to produce the result, the application building a key derivation function, using the result, and deriving a key.

3. The method according to claim 1, further comprising: before the application providing the second input values, the application prepending the hash value T1 with zero bits as XORed with appropriate octets of the constants C and D.

4. The method according to claim 1, the method further comprising:
   after receiving the pointer to the key K:
      the application providing the pointer to the module, and requesting the module to compute a hash operation on the key K; and,
      the module returning the hashed key to the application.

5. The method according to claim 4, the method further comprising:
    after the application receives the hashed key, the application directing the module to designate the hashed key as another secret with a new pointer.

6. The method according to claim 1, wherein the cryptographic hash function comprises SHA-1.

7. The method according to claim 1, wherein the iterative cryptographic function comprises P_SHA-1.

8. A cryptographic hardware device operative to execute the method of claim 1.

9. A cryptographic device comprising:
    a CPU in communication with a memory, storage media and a private key module; and,
    an application executing on the device operative to:
    i) request the private key module of the computing device to divide a secret value into a first part and a second part;
    ii) receive from the module one of the first half and the second half and a pointer to a key K comprising the other of the first half and the second half;
    iii) provide a public constant D, a message M and the pointer to the key K as input values to the module, and request the module to compute a cryptographic hash function using the input values;
    iv) receive a computed hash value T1 from the module;
    v) provide a public constant C, the hash value T1 and the pointer to the key K as second input values to the module, and request the module to perform the cryptographic hash function using the second input values;
    vi) receive a hash function output computed by the module from the second input values; and,
    vii) compute an iterative cryptographic function using the one of the first half and the second half and the hash function output to produce a result.

10. The device according to claim 9, wherein the application is further operative to: after the application produces the result, build a key derivation function using the result and derive a key.

11. The device according to claim 10, wherein the application is further operative to: before the application provides the second input values, prepend the hash value T1 with zero bits as XORed with appropriate octets of the constants C and D.

12. The device according to claim 9, wherein the application is further operative to: after the application receives the pointer to the key K, provide the pointer to the module, request the module to compute a hash operation on the key K, and receive the hashed key from the module.

13. The device according to claim 12, wherein the application is further operative to: after the application receives the hashed key, direct the module to designate the hashed key as another secret with a new pointer.

14. The device according to claim 9, wherein the cryptographic hash function comprises SHA-1.

15. The device according to claim 9, wherein the iterative cryptographic function comprises P_SHA-1.

* * * * *